(12) United States Patent
Park

(10) Patent No.: US 12,334,598 B2
(45) Date of Patent: Jun. 17, 2025

(54) CID FILTER AND SECONDARY BATTERY COMPRISING THE SAME

(71) Applicant: LG Energy Solution, Ltd., Seoul (KR)

(72) Inventor: Min Hee Park, Daejeon (KR)

(73) Assignee: LG Energy Solution, Ltd., Seoul (KR)

(*) Notice: Subject to any disclaimer, the term of this patent is extended or adjusted under 35 U.S.C. 154(b) by 714 days.

(21) Appl. No.: 17/438,297

(22) PCT Filed: Mar. 31, 2020

(86) PCT No.: PCT/KR2020/004434
§ 371 (c)(1),
(2) Date: Sep. 10, 2021

(87) PCT Pub. No.: WO2020/251147
PCT Pub. Date: Dec. 17, 2020

(65) Prior Publication Data
US 2022/0190450 A1     Jun. 16, 2022

(30) Foreign Application Priority Data

Jun. 11, 2019 (KR) .................. 10-2019-0068935

(51) Int. Cl.
*H01M 50/578* (2021.01)
*H01M 50/152* (2021.01)

(52) U.S. Cl.
CPC ....... *H01M 50/578* (2021.01); *H01M 50/152* (2021.01)

(58) Field of Classification Search
CPC .. H01M 50/578; H01M 50/172; H01M 50/10; H01M 50/50
See application file for complete search history.

(56) References Cited

U.S. PATENT DOCUMENTS

| 5,750,277 A | 5/1998 | Vu et al. |
| 6,346,344 B1 | 2/2002 | Song et al. |
| 2011/0076527 A1 | 3/2011 | Kim et al. |
| 2012/0028090 A1* | 2/2012 | Kyung-Su ........... H01M 50/169 429/185 |
| 2015/0072179 A1 | 3/2015 | Itabashi |
| 2017/0194619 A1 | 7/2017 | Kim |
| 2017/0317326 A1 | 11/2017 | Fujikawa et al. |

(Continued)

FOREIGN PATENT DOCUMENTS

| KR | 20000006381 U | 4/2000 |
| KR | 20060105920 A | 10/2006 |
| KR | 20080036248 A | 4/2008 |

(Continued)

OTHER PUBLICATIONS

Extended European Search Report for Application No. 20821765.3 dated May 31, 2022. 7 pgs.

(Continued)

*Primary Examiner* — Kenneth J Douyette
(74) *Attorney, Agent, or Firm* — Lerner David LLP

(57) ABSTRACT

According to one aspect of the present invention, a body part of a CID filter of a secondary battery has a main through-hole and an auxiliary through-hole defined therein. The auxiliary hole is positioned between a CID gasket and an area of the CID filter that is electrically connected to an electrode tab.

20 Claims, 5 Drawing Sheets

(56) References Cited

U.S. PATENT DOCUMENTS

2018/0123163 A1* 5/2018 Park .................. H01M 50/1535
2018/0198108 A1   7/2018 Yoon et al.

FOREIGN PATENT DOCUMENTS

| KR | 20110035625 A | 4/2011 |
| KR | 20140114429 A | 9/2014 |
| KR | 20150051518 A | 5/2015 |
| KR | 20170081449 A | 7/2017 |
| KR | 20180018279 A | 2/2018 |
| KR | 20180081292 A | 7/2018 |

OTHER PUBLICATIONS

International Search Report for Application No. PCT/KR2020/004434, mailing Jul. 6, 2020, 2 pages.

* cited by examiner

CID FILTER AND SECONDARY BATTERY COMPRISING THE SAME

CROSS-REFERENCE TO RELATED APPLICATIONS

The present application is a national phase entry under 35 U.S.C. § 371 of International Application No. PCT/KR2020/004434 filed Mar. 31, 2020, which claims priority from Korean Patent Application No. 10-2019-0068935, filed on Jun. 11, 2019, which is hereby incorporated by reference in its entirety.

TECHNICAL FIELD

The present invention relates to a CID filter and a secondary battery comprising the CID filter, and more particularly, to a CID filter having improved safety under an abnormal high-temperature condition and a secondary battery comprising the CID filter.

BACKGROUND ART

Secondary batteries that are repetitively chargeable and dischargeable may be divided into cylindrical type secondary batteries, prismatic type secondary batteries, and pouch type secondary batteries according to their structures and manufacturing methods. In general, among them, the cylindrical type secondary battery has a structure in which an electrode assembly is accommodated in a cylindrical can with an upper portion opened, and a top cap is coupled to the upper portion of the cylindrical can.

In order to prevent explosion or fire that may occur when a temperature or pressure inside the cylindrical type secondary battery exceeds a certain value, generally, the cylindrical type secondary battery is provided with safety devices such as a safety vent and a CID filter. According to the related art, when the pressure inside the cylindrical type secondary battery exceeds a certain value, current is cut off by breaking the safety vent, and a gas inside the secondary battery is discharged to the outside.

One of the reasons for the abnormal increase in temperature or pressure inside the cylindrical type secondary battery is a short circuit phenomenon. When a short circuit occurs, heat is generated inside the cylindrical type secondary battery.

Particularly, a lot of heat is generated in a region in which an electrode tab protruding from an electrode assembly and the CID filter are bonded to each other. According to the related art, the heat generated in the region in which the electrode tab and the CID filter are bonded to each other passes through the CID filter and then is transferred to a CID gasket disposed around the CID filter, and thus, a temperature of the CID gasket increases to cause a problem in which the CID gasket is melted. In this case, even if the safety vent is broken, since the safety vent and the CID filter become reconnected to each other in the circumferential area of the CID filter, the current of the cylindrical type secondary battery is prevented from being cut off, and thus the safety of the cylindrical type secondary battery is impeded.

DISCLOSURE OF THE INVENTION

Technical Problem

Therefore, the problem to be solved by the present invention is to solve a problem of melting a CID gasket by minimizing heat transferred to the CID gasket through a CID filter even if a short circuit occurs in a cylindrical type secondary battery.

Technical Solution

According to one aspect of the present invention for achieving the above object, provided is a secondary battery comprising: an electrode assembly having a structure in which electrodes and separators are alternately disposed; a battery can configured to accommodate the electrode assembly and having an opened upper portion; a top can coupled to the upper portion of the battery can; a CID filter provided below the top cap; a CID gasket provided in close contact with a side portion of the CID filter; and an electrode tab protruding from the electrode assembly, the electrode tab being electrically connected to the CID filter, wherein the CID filter comprises a body part defining a main body, the body part comprises: a plurality of main though-holes provided along a circumference of the body part and each of which has a first width (W1); and an auxiliary through-hole having a second width (W2) less than the first width (W1), an area (hereinafter, referred to as a 'first connection area') of the CID filter, which is electrically connected to the electrode tab, leans toward one side with respect to a center of the CID filter, and the auxiliary through-hole is defined between the first connection area and the CID gasket.

The auxiliary through-hole may be defined in a connection area (hereinafter, referred to as a 'second connection area') of the body part configured to connect the main through-holes to each other along a circumferential direction of the body part.

The auxiliary through-hole may be defined in a circular arc of a virtual circle that is centered at a center of the CID filter while crossing the shortest distance between the first connection area and the CID gasket, and the second connection areas, in which the auxiliary through-hole is not defined, among the plurality of second connection areas may be not disposed in the circular arc.

The second connection areas, in which the auxiliary through-hole is defined, among the plurality of second connection areas may be disposed adjacent to each other, and the second connection areas, in which the auxiliary through-hole is not defined, among the plurality of second connection areas may be disposed adjacent to each other.

A circumference of the body part may have a circular shape, and a middle point of the circular arc may be disposed in a semi-straight line extending outward from the center of the CID filter.

A central angle of the circular arc may range of 90 degrees to 180 degrees.

The first connection area may be disposed at a center of the shortest distance between a center of the CID filter and the CID gasket.

The circular arc may cross a center of the shortest distance between the first connection area and the CID gasket.

According to another aspect of the present invention for achieving the above object, provided is a CID filter comprising: a body part defining a main body, wherein the body part comprises: a plurality of main though-holes provided along a circumference of the body part and each of which has a first width (W1); and an auxiliary through-hole having a second width (W2) less than the first width (W1), a first point is defined at an area that leans toward one side with respect to a center of the body part, a second point is defined at a circumference of the body part, and the auxiliary through-hole is defined between the first point and the second point, wherein the auxiliary through-hole is defined in a connection area (hereinafter, referred to as a 'second connection area') of the body part configured to connect the main through-holes to each other along a circumferential direction of the body part.

The plurality of main through-holes may be provided at equal intervals along the circumferential direction of the body part.

The auxiliary through-hole may be connected to the two main through-holes defined in both sides of the second connection area in which the auxiliary through-hole is defined.

The auxiliary through-hole may be spaced apart from the two main through-holes defined in both sides of the second connection area in which the auxiliary through-hole is defined.

A plurality of the auxiliary through-holes may be provided in the second connection area in which the auxiliary through-hole is defined.

Since a total of N main through-holes are defined in the body part, a total of N connection areas may be provided, and the number of second connection areas, in which the auxiliary through-holes are defined, among the total N second connection areas may be N/2 or less (i) when N is an even number and is (N−1)/2 or less (ii) when N is an odd number.

A total of eight main through-holes may be defined, and the number of second connection areas in which the auxiliary through-holes are defined may range of one to four.

Advantageous Effects

According to the present invention, even if a short circuit occurs in the cylindrical type secondary battery, the heat transferred to the CID gasket through the CID filter may be minimized to solve the problem of melting the CID gasket.

MODE FOR CARRYING OUT THE INVENTION

Hereinafter, a secondary battery and a structure of a CID filter according to the present invention will be described with reference to the drawings.

Secondary Battery and CID Filter

Figure 1:
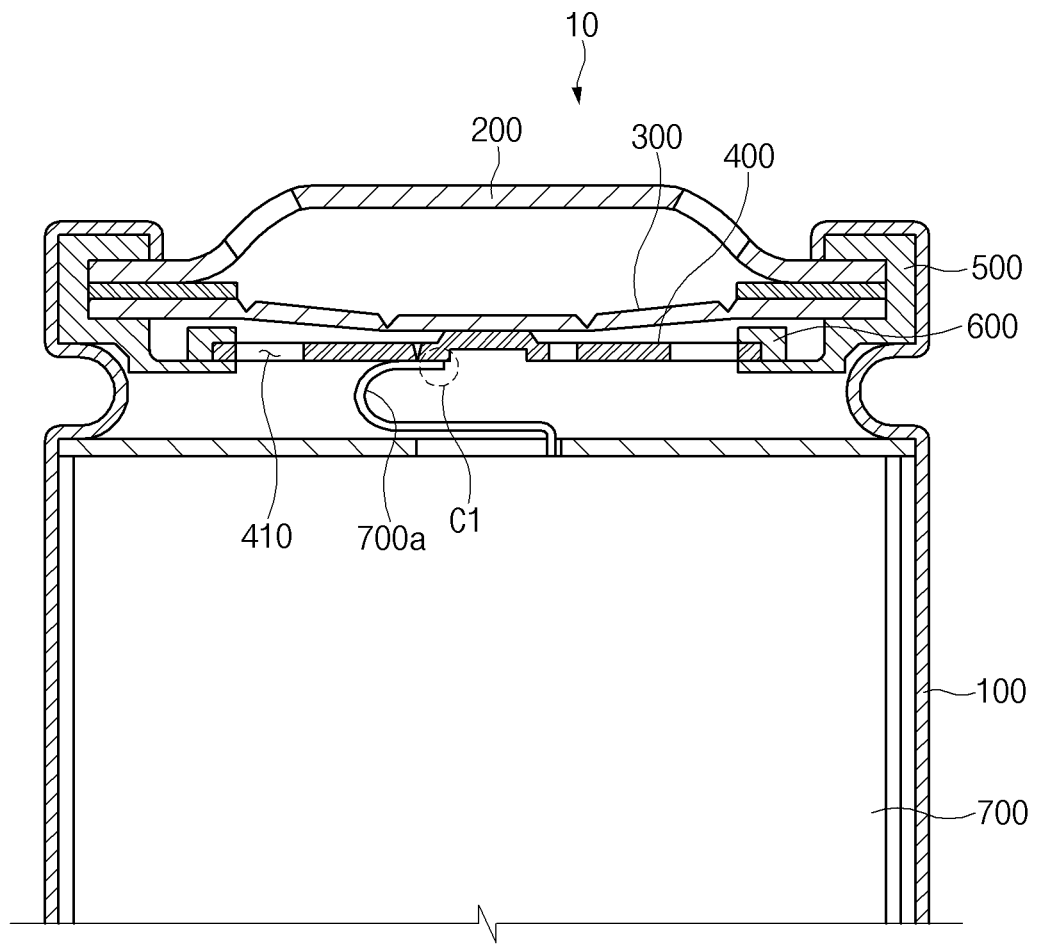
FIG. 1 is a side cross-sectional view illustrating a structure of a secondary battery according to the present invention.

FIG. 1 is a side cross-sectional view illustrating a structure of a secondary battery according to the present invention.

As illustrated in FIG. 1, a secondary battery 10 according to the present invention may comprise a battery can 100 having a structure with an upper portion opened. The battery can 100 may have a cylindrical shape in a horizontal cross-section. That is, the secondary battery according to the present invention may be a cylindrical type secondary battery.

A top cap 200 may be disposed on the upper portion of the battery can 100. In more detail, as illustrated in FIG. 1, a top cap 200 may be coupled to the upper portion of the battery can 100.

A safety vent 300 may be provided below the top cap 200. When a pressure inside the secondary battery 10 exceeds a certain value, the safety vent 300 may be configured to be broken to cut off the current of the secondary battery 10 and provide a path through which a gas inside the secondary battery 10 is discharged to the outside. As illustrated in FIG. 1, a notch portion having a relatively thin thickness compared to other areas of the safety vent may be provided in the safety vent 300.

A CID filter 400 may also be provided below the top cap 200. In more detail, the CID filter 400 may be provided below the safety vent 300. As illustrated in FIG. 1, a central area of the CID filter 400 and a central area of the safety vent 300 may be bonded to each other. Thus, when a pressure inside the secondary battery 10 exceeds a certain value, and thus the safety vent is broken to move upward, the CID filter 400 may also move upward to cut off the current of the secondary battery 10.

A gasket 500 may be provided in close contact with an inner surface of the battery can 100. As illustrated in FIG. 1, the gasket 500 may be provided in close contact with circumferential areas of the top cap 200 and the safety vent 300. The gasket 500 may be configured to seal the inside the secondary battery 10.

The secondary battery according to the present invention may further comprise a CID gasket 600 that is in close contact with a side portion of the CID filter 400. The CID gasket 600 is provided to be separated from the above-described gasket 500 and may be configured to prevent the CID filter 400 and the safety vent 300 from directly contacting each other on the circumferential area of the CID filter 400. Thus, as illustrated in FIG. 1, the CID gasket 600 may be provided between the CID filter 400 and the safety vent 300 at the side portion of the CID filter 400. Each of the gasket 500 and the CID gasket 600 may be made of a material having electrical insulation properties.

An electrode assembly 700 may be accommodated in the battery can 100. The electrode assembly 700 may have a structure in which electrodes and separators are alternately disposed. For example, the electrode assembly 700 may be a jelly-roll type electrode assembly.

The electrode assembly 700 may comprise an electrode tab 700a. As illustrated in FIG. 1, the electrode tab 700a may have a structure protruding from the electrode assembly 700. Also, the electrode tab 700a may be electrically connected to the CID filter 400. The electrode tab 700a and the CID filter 400 may be connected to each other, for example, through welding. In this specification, an area of the CID filter 400, which is electrically connected to the electrode tab 700a will be referred to as a 'first connection area'. The first connection area C1 may lean toward one side with respect to a center of the CID filter 400. FIG. 1 illustrates a state in which the first connection area C1 leans toward a left side with respect to the center of the CID filter 400.

Figure 2:
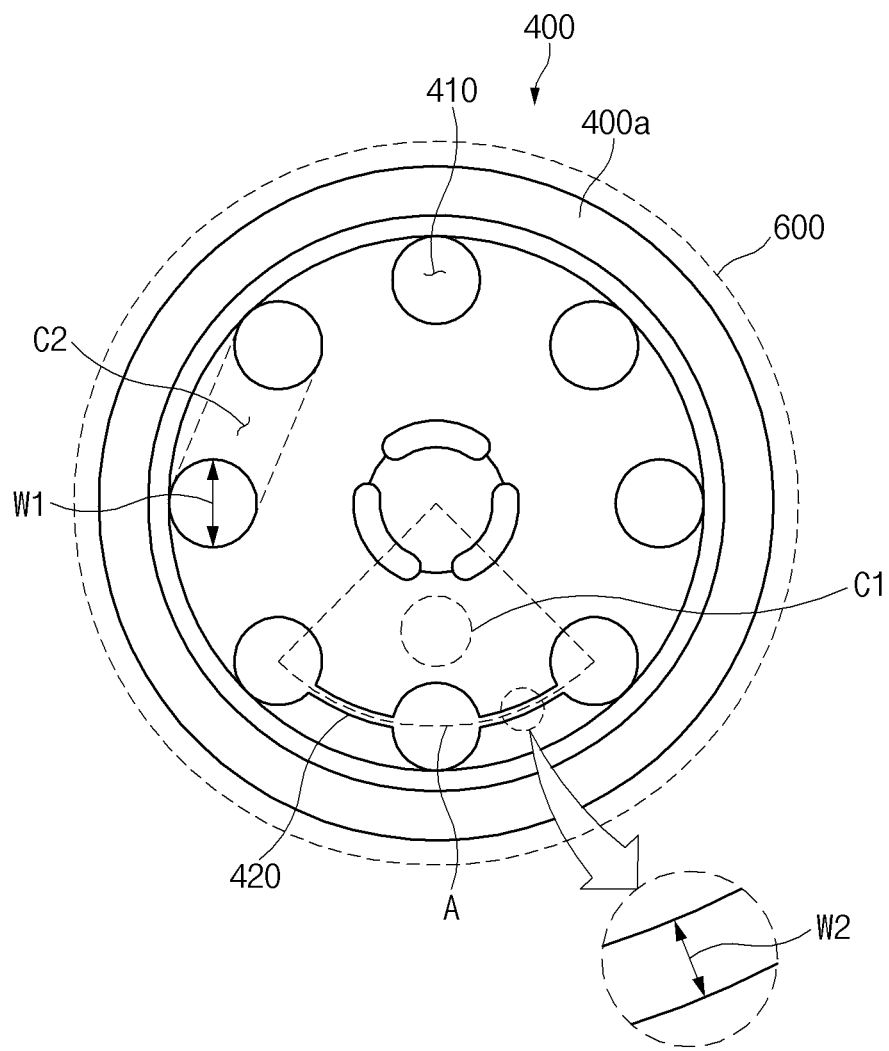
FIG. 2 is a plan view illustrating an example of a structure of a CID filter according to an embodiment of the present invention.
Figure 3:
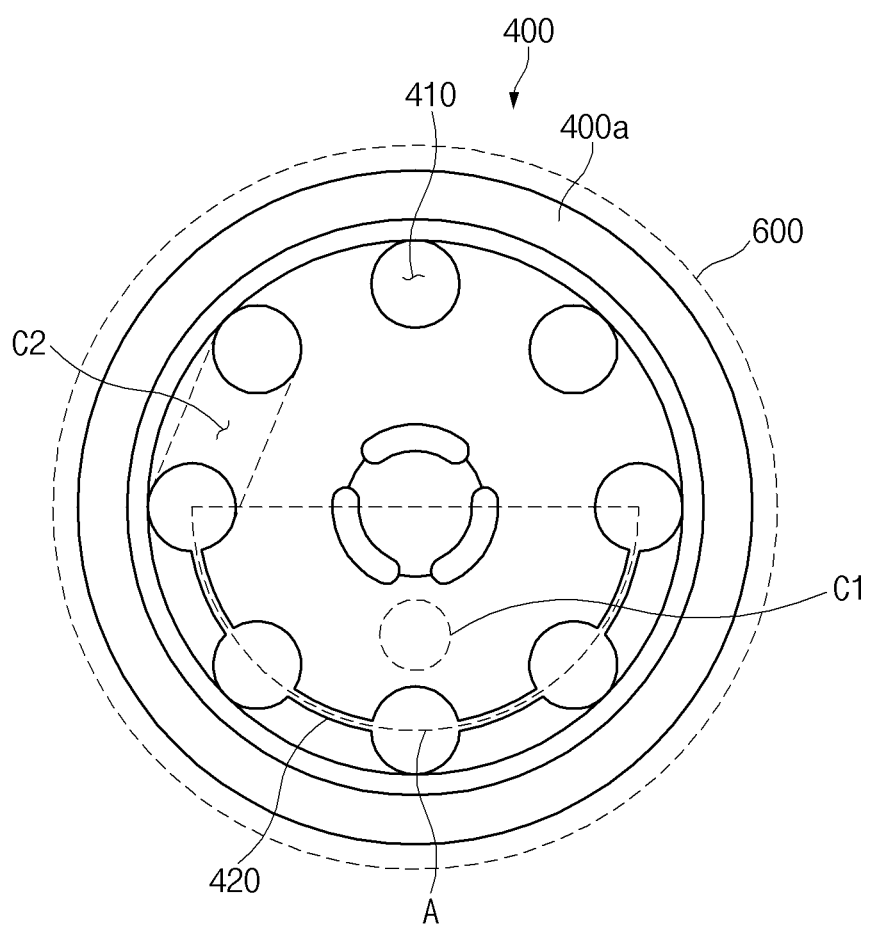
FIG. 3 is a plan view illustrating another example of the structure of the CID filter according to an embodiment of the present invention.

FIG. 2 is a plan view illustrating an example of the structure of the CID filter according to an embodiment of the present invention, and FIG. 3 is a plan view illustrating another example of the structure of the CID filter according to an embodiment of the present invention.

As illustrated in FIGS. 2 and 3, the CID filter 400 according to an embodiment of the present invention may comprise a body part 400a defining a main body. A circumference of the body part 400a may have a circular shape.

A plurality of main through-holes 410 provided along a circumference of the body part 400a may be defined in the body part 400a of the CID filter 400. As illustrated in FIG. 2, the main through-hole 410 may have a first width W1. The main through-hole 410 may have a circular shape. When the main through-hole 410 has the circular shape, the first width W1 may be a diameter of the main through-hole 410. Also, the main through-hole 410 may be provided at equal intervals along the circumference of the body part 400a. FIGS. 2 and 3 illustrate a case in which eight main through-holes 410 are provided at equal intervals along a circumferential direction of the body part 400a having the circular shape in the CID filter 400.

The plurality of main through-holes 410 defined in the body part 400a of the CID filter 400 may be illustrated as being connected to each other by some areas of the body part 400a. In more detail, the plurality of main through-holes 410 may be connected to each other along the circumferential direction of the body part 400a by some areas of the body part 400a. In this specification, the area of the body part 400a of the CID filter, which connects the plurality of main through-holes 410 to each other along the circumferential direction of the body part 400a, will be referred to as a 'second connection area'. FIGS. 2 and 3 illustrate a case in which eight second connection areas C2 are provided between the main through-holes 410 to correspond to the eight main through-holes 410.

An auxiliary through-hole 420 having a second width W2 may be defined in the body part 400a of the CID filter 400 according to the present invention. Here, the second width W2 may be less than the first width W1. That is, the auxiliary through-hole 420 may have a width less than that of the main through-hole 410.

Subsequently, referring to FIG. 2, in the CID filter 400 according to the present invention, the auxiliary through-hole 420 may be defined in the second connection area C2. According to the present invention, since the auxiliary through-hole 420 is defined in the second connection area C2 connecting the main through-holes 410 to each other, the heat transfer may be minimized due to heat conduction between the inside of the CID filter 400 in a central direction and the outside of the CID filter 400 in a circumferential direction.

Referring to FIG. 1 based on the above contents, in the secondary battery 10 according to the present invention, the auxiliary through-hole 420 (see FIG. 2) of the CID filter 400 may be provided between the first connection area C1 and the CID gasket 600. Thus, according to the present invention, transfer of heat transferred from the first connection area (that is, the area on which the CID filter and the electrode tab are electrically connected to each other), which generate a lot of heat in the secondary battery 10, to the CID gasket 600 may be minimized to prevent a problem of melting the CID gasket 600 from occurring.

The above feature of the present invention with respect to the auxiliary through-hole 420 may be understood as allowing the auxiliary through-hole 420 to block the shortest path of the heat transfer between a first point and a second point by providing the auxiliary through-hole 420 between the virtual first point disposed on an area that leans toward one side with respect to the center of the body part 400a and the virtual second point disposed around the body part 400a.

Subsequently, referring to FIG. 2, the auxiliary through-hole 420 according to the present invention may be defined only in the second connection area C2 of a portion of the plurality of second connection areas C2. FIG. 2 illustrates a case in which the auxiliary through-hole 420 is defined in each of two second connection areas C2 of the eight second connection areas C2. However, as illustrated in FIG. 3, the auxiliary through-hole 420 may be defined in each of four second connection areas C2 of the eight second connection areas C2. Alternatively, the auxiliary through-hole 420 may be defined in one or three second connection areas C2 of the eight second connection areas C2. That is, according to the present invention, when the eight main through-holes 410 are defined in the CID filter 400, the number of second connection areas C2 in which the auxiliary through-holes 420 are defined may range of one to four.

As described above, the first connection area C1 may lean toward the one side with respect to the center of the CID filter 400. Here, as illustrated in FIGS. 2 and 3, the auxiliary through-hole 420 may be defined in the second connection areas C2, which are disposed at a side to which the first connection area C1 leans, of the eight second connection areas C2.

The CID gasket 600 may be easily melted in the secondary battery 10, particularly, on an area on which the first connection area C1, in which a lot of heat is generated, is relatively close to the CID gasket 600. Thus, the structure in which the second connection areas C2 are disposed adjacent to the area, on which the first connection area C1 leans, of the plurality of second connection areas C2 provided on the CID filter 400.

The number of second connection areas C2, in which the auxiliary through-holes 420 are defined, according to the number of main through-holes 410 will be described as follows by generalizing the foregoing contents.

When total N main through-holes 410 are defined in the body part 400a, total N second connection areas C2 connecting the plurality of main through-holes 410 to each other may also be provided. Here, the number of second connection areas C2, in which the auxiliary through-holes 420 are defined, among the total N second connection areas C2 is (i) N/2 or less when N is an even number and (ii) (N−1)/2 or less when N is an odd number.

Also, as illustrated in FIGS. 2 and 3, according to the present invention, the second connection areas C2, in which the auxiliary through-holes 420 are defined, among the plurality of second connection areas C2 provided on the CID filter 400 may be disposed adjacent to each other, and the second connection areas C2, in which the auxiliary through-holes 420 are not defined, among the plurality of second connection areas C2 may also be disposed adjacent to each other. This may be understood as having a structure in which the second connection areas C2, in which the auxiliary through-holed 420 are defined, among the plurality of second connection areas C2 are continuously disposed along the circumferential direction of the body part 400a, and simultaneously, the second connection areas C2, in which the auxiliary through-holes 420 are not defined, among the plurality of second connection areas C2 are continuously disposed along the circumferential direction of the body part 400a.

In the CID filter 400 according to the present invention, the area in which the auxiliary through-hole 420 is defined may be described by introducing the concept of a circular arc of a virtual circle.

That is, referring to FIGS. 1 to 3, the auxiliary through-hole 420 may be provided to cross the shortest distance between the first connection area C1 and the CID gasket 600. For this, the auxiliary through-hole 420 may be defined in the circular arc A of the virtual circle that is centered at the center of the CID filter 400. Also, the second connection areas C2, in which the auxiliary through-holes 420 are not defined, among the plurality of second connection areas C2 may not be provided on the circular arc A.

When the second connection areas C2, in which the auxiliary through-holes 420 are defined, among the plurality of second connection areas C2 provided on the CID filter 400 are disposed adjacent to each other, the virtual circular arc A may be defined as a circular arc that is centered at the center of the body part 400a and uses the centers of the two main through-holes 410 (for example, in FIG. 2, the main through-holes respectively defined in left and right lower portions of the CID filter) adjacent to the second connection areas C2, in which the auxiliary through-holes 420 are defined, as both ends.

As described above, since the circumference of the body part 400a has a circular shape, a middle point of the virtual circular arc A may be disposed in a semi-straight line extending outward from the center of the CID filter 400.

Also, a central angle of the virtual circular arc A may range of 90 degrees to 180 degrees. FIG. 2 illustrates a case in which the central angle of the virtual circular arc A is 90 degrees, and FIG. 3 illustrates a case in which the central angle of the virtual circular arc A is 180 degrees. When the central angle of the virtual circular arc A exceeds 180 degrees, the shape of the CID filter may not be properly maintained because too many of the auxiliary through-holes 420 are provided, and durability of the CID filter may be deteriorated. When the central angle of the virtual circular arc A is less than 90 degrees, the blocking of the heat transfer due to the auxiliary through-holes 420 may not effectively occur.

Subsequently, referring to FIGS. 1 to 3, the first connection area C1 may be disposed at a center of the shortest distance between the center of the CID filter and the CID gasket 600, and the virtual circular arc A may cross a center of the shortest distance between the first connection area C1 and the CID gasket 600.

As illustrated in FIGS. 2 and 3, according to an embodiment of the present invention, the auxiliary through-hole 420 may be connected to two main through-holes 410 defined in both sides of the second connection area C2 in which the auxiliary through-hole 420 is defined. That is, according to an embodiment of the present invention, the auxiliary through-hole 420 and the main through-hole 410 adjacent to the auxiliary through-hole 420 may be connected to each other.

Figure 4:
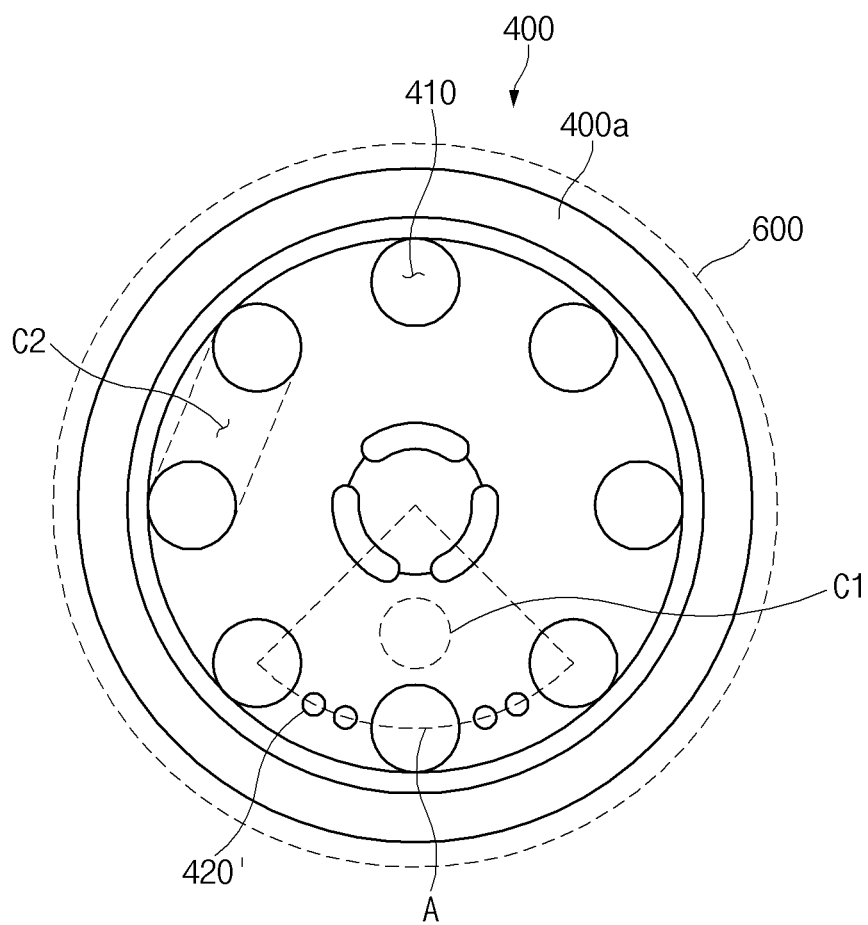
FIG. 4 is a plan view illustrating an example of a structure of a CID filter according to another embodiment of the present invention.
Figure 5:
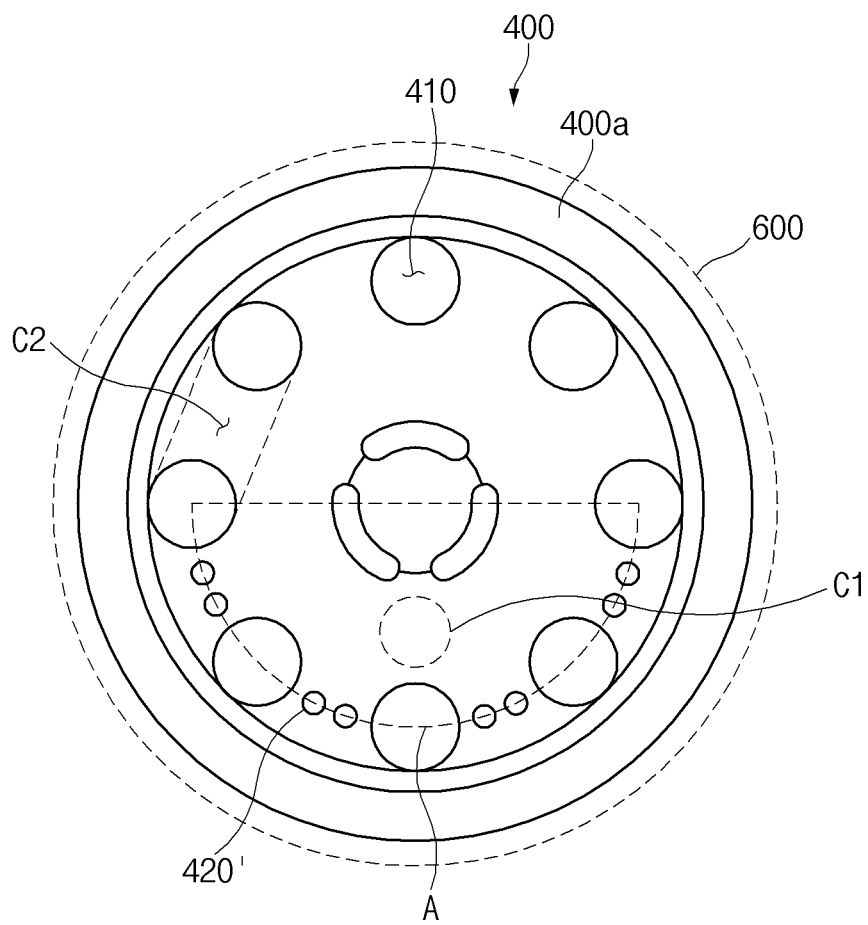
FIG. 5 is a plan view illustrating an example of the structure of the CID filter according to another embodiment of the present invention.

FIG. 4 is a plan view illustrating an example of a structure of a CID filter according to another embodiment of the present invention, and FIG. 5 is a plan view illustrating an example of the structure of the CID filter according to another embodiment of the present invention.

Within a range that does not contradict the foregoing disclosure, the above descriptions of the structure of the CID filter according to an embodiment of the present invention may be equally applied to descriptions of a structure of a CID filter according to another embodiment of the present invention. Hereinafter, the structure of the CID filter according to another embodiment of the present invention will be described mainly based on differences from the structure of the CID filter according to an embodiment of the present invention.

Unlike the forgoing embodiment of the present invention, according to another embodiment of the present invention, an auxiliary through-hole 420' may be spaced a predetermined distance from two main through-holes 410 defined in both sides of a second connection area C2 in which the auxiliary through-hole 420' is defined. Also, according to another embodiment of the present invention, a plurality of the auxiliary through-holes 420' may be provided in the second connection area C2 in which the auxiliary through-hole 420' is defined.

According to another embodiment of the present invention, the auxiliary through-hole 420' may have a circular shape. When the auxiliary through-hole 420' has a circular shape, a width of the auxiliary through-hole 420' (that is, a second width) may be a diameter of the auxiliary through-hole 420'.

FIGS. 4 and 5 illustrate a case in which two auxiliary through-holes 420', each of which has a circular shape, are defined in the second connection area C2 in which the auxiliary through-holes 420' is defined.

While the embodiments of the present invention have been described with reference to the specific embodiments, it will be apparent to those skilled in the art that various changes and modifications may be made without departing from the spirit and scope of the invention as defined in the following claims.

The invention claimed is:

1. A secondary battery comprising:
    an electrode assembly having a structure in which electrodes and separators are alternately disposed;
    a battery can configured to accommodate the electrode assembly and having an open upper portion;
    a top cap coupled to the open upper portion of the battery can;
    a CID filter positioned below the top cap;
    a CID gasket positioned in close contact with a side portion of the CID filter; and
    an electrode tab protruding from the electrode assembly, the electrode tab being electrically connected to the CID filter at a first connection area of the CID filter,
    wherein the CID filter comprises a body part defining a main body,
    the body part comprising:
    a plurality of main though-holes disposed along a circumferential direction of the body part, each of the main through-holes having a first width (W1); and
    an auxiliary through-hole having a second width (W2) less than the first width (W1); and
    wherein the body part includes a plurality of second connection areas, each of the second connection areas defined by an area connecting any one of the main through-holes to an adjacent one of the main through-holes along the circumferential direction of the body part, and wherein the auxiliary through-hole is defined in at least one of the second connection areas.

2. The secondary battery of claim 1, wherein the auxiliary through-hole is defined in a circular arc centered at a center of the CID filter and crossing the shortest distance between the first connection area and the CID gasket, and
    wherein the second connection areas in which the auxiliary through-hole is not defined are not disposed in the circular arc.

3. The secondary battery of claim 1, wherein the second connection areas in which the auxiliary through-hole is defined are disposed adjacent to each other, and wherein the second connection areas in which the auxiliary through-hole is not defined are disposed adjacent to each other.

4. The secondary battery of claim 1, wherein a circumference of the body part defines a circular shape.

5. The secondary battery of claim 2, wherein a central angle subtended by the circular arc from a first terminal end of the circular arc to an opposing, second terminal end of the circular arc ranges from 90 degrees to 180 degrees.

6. The secondary battery of claim 1, wherein the first connection area is disposed at a midpoint of the shortest distance between a center of the CID filter and the CID gasket.

7. The secondary battery of claim 2, wherein the circular arc crosses a midpoint of the shortest distance between the first connection area and the CID gasket.

8. The secondary battery of claim 1, wherein a total of 'N' of the second connection areas are provided in the body part, and
wherein a number of the second connection areas in which the at least one auxiliary through-hole is defined is:
(i) N/2 or fewer when N is an even number, or
(ii) (N−1)/2 or fewer when N is an odd number.

9. A secondary battery, comprising:
an electrode assembly having a structure in which electrodes and separators are alternately disposed;
a battery can configured to accommodate the electrode assembly and having an open upper portion;
a top cap coupled to the open upper portion of the battery can;
a CID filter positioned below the top cap;
a CID gasket positioned in close contact with a side portion of the CID filter; and
an electrode tab protruding from the electrode assembly, the electrode tab being electrically connected to the CID filter at a first connection area of the CID filter,
wherein the CID filter comprises a body part defining a main body,
the body part comprising:
a plurality of main though-holes disposed along a circumferential direction of the body part, each of the main through-holes having a first width (W1); and
an auxiliary through-hole having a second width (W2) less than the first width (W1), the auxiliary through-hole connecting any one of the main through-holes to an adjacent one of the main through-holes along the circumferential direction of the body part.

10. The secondary battery of claim 9, wherein the body part includes a plurality of second connection areas, each of the second connection areas defined by an area connecting any one of the main through-holes to an adjacent one of the main through-holes along the circumferential direction of the body part, and wherein the auxiliary through-hole is defined in at least one of the second connection areas.

11. The secondary battery of claim 10, wherein a total of 'N' of the second connection areas are provided in the body part, and
wherein a number of the second connection areas in which the at least one auxiliary through-hole is defined is:
(i) N/2 or fewer when N is an even number, or
(ii) (N−1)/2 or fewer when N is an odd number.

12. The secondary battery of claim 10, wherein the second connection areas in which the auxiliary through-hole is defined are disposed adjacent to each other, and wherein the second connection areas in which the auxiliary through-hole is not defined are disposed adjacent to each other.

13. The secondary battery of claim 10, wherein the auxiliary through-hole is defined in a circular arc centered at a center of the CID filter and crossing the shortest distance between the first connection area and the CID gasket, and
wherein the second connection areas in which the auxiliary through-hole is not defined are not disposed in the circular arc.

14. The secondary battery of claim 13, wherein a central angle subtended by the circular arc from a first terminal end of the circular arc to an opposing, second terminal end of the circular arc ranges from 90 degrees to 180 degrees.

15. The secondary battery of claim 13, wherein the circular arc crosses a midpoint of the shortest distance between the first connection area and the CID gasket.

16. The secondary battery of claim 9, wherein the first connection area of the CID filter is offset from a center of the CID filter towards a first side of the CID filter, and wherein the auxiliary through-hole is positioned between the first connection area and the CID gasket.

17. The secondary battery of claim 9, wherein a circumference of the body part defines a circular shape.

18. The secondary battery of claim 9, wherein the first connection area is disposed at a midpoint of the shortest distance between a center of the CID filter and the CID gasket.

19. A secondary battery comprising:
an electrode assembly having a structure in which electrodes and separators are alternately disposed;
a battery can configured to accommodate the electrode assembly and having an open upper portion;
a top cap coupled to the open upper portion of the battery can;
a CID filter positioned below the top cap;
a CID gasket positioned in close contact with a side portion of the CID filter; and
an electrode tab protruding from the electrode assembly, the electrode tab being electrically connected to the CID filter at a first connection area of the CID filter offset from a center of the CID filter towards a first side of the CID filter,
wherein the CID filter comprises a body part defining a main body,
the body part comprising:
a plurality of main though-holes disposed along a circumferential direction of the body part, each of the main through-holes having a first width (W1); and
an auxiliary through-hole having a second width (W2) less than the first width (W1), the auxiliary through-hole being positioned between the first connection area and the CID gasket; and
wherein the body part includes a plurality of second connection areas, each of the second connection areas defined by an area connecting any one of the main through-holes to an adjacent one of the main through-holes along the circumferential direction of the body part, and wherein the auxiliary through-hole is defined in at least one of the second connection areas.

20. The secondary battery of claim 19, wherein the auxiliary through-hole is defined in a circular arc centered at a center of the CID filter.

* * * * *